US012771914B2

(12) United States Patent
Guérin et al.

(10) Patent No.: US 12,771,914 B2
(45) Date of Patent: *Oct. 20, 2026

(54) AUTO EXPOSURE FOR SPHERICAL IMAGES

(71) Applicant: GoPro, Inc., San Mateo, CA (US)

(72) Inventors: Guillaume Matthieu Guérin, Chatillon (FR); Sylvain Leroy, Bures-sur-Yvette (FR); Yoël Taïeb, Paris (FR); Giuseppe Moschetti, Saint Cloud (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/036,730

(22) Filed: Jan. 24, 2025

(65) Prior Publication Data

US 2025/0240508 A1 Jul. 24, 2025

Related U.S. Application Data

(63) Continuation of application No. 18/388,472, filed on Nov. 9, 2023, now Pat. No. 12,212,823, which is a continuation of application No. 17/713,606, filed on Apr. 5, 2022, now Pat. No. 11,825,179, which is a continuation of application No. 16/994,264, filed on Aug. 14, 2020, now Pat. No. 11,323,603.

(Continued)

(51) Int. Cl.

| | |
|---|---|
| ***H04N 5/235*** | (2006.01) |
| ***G06T 3/4038*** | (2024.01) |
| ***H04N 9/77*** | (2006.01) |
| ***H04N 13/156*** | (2018.01) |
| ***H04N 23/45*** | (2023.01) |
| ***H04N 23/71*** | (2023.01) |
| ***H04N 23/73*** | (2023.01) |

(52) U.S. Cl.

CPC ........... *H04N 23/45* (2023.01); *G06T 3/4038* (2013.01); *H04N 9/77* (2013.01); *H04N 13/156* (2018.05); *H04N 23/71* (2023.01); *H04N 23/73* (2023.01)

(58) Field of Classification Search

CPC .. H04N 5/2258; H04N 5/2351; H04N 5/2353; H04N 9/77; H04N 13/156; H04N 5/23238; H04N 5/2352; G06T 3/4038

See application file for complete search history.

(56) References Cited

U.S. PATENT DOCUMENTS

| | | | | |
|---|---|---|---|---|
| 11,825,179 B2 * | 11/2023 | Guérin | .................. | G06T 3/4038 |
| 2011/0169921 A1 * | 7/2011 | Lee | ........................ | H04N 23/67 348/46 |

(Continued)

*Primary Examiner* — Howard D Brown, Jr.

(74) *Attorney, Agent, or Firm* — Young Basile Hanlon & MacFarlane, P.C.

(57) ABSTRACT

Auto exposure processing for spherical images improves image quality by reducing visible exposure level variation along a stitch line within a spherical image. An average global luminance value is determined based on luminance values determined for first and second images, which are based on auto exposure configurations of first and second image sensors used to obtain those first and second images. Delta luminance values are determined for the first and second images using the average global luminance value. The first and second images are then updated using the delta luminance values, and the updated first and second images are used to produce a spherical image.

20 Claims, 12 Drawing Sheets

Related U.S. Application Data

(60) Provisional application No. 62/901,857, filed on Sep. 18, 2019.

(56) References Cited

U.S. PATENT DOCUMENTS

| | | | | |
|---|---|---|---|---|
| 2019/0007590 | A1* | 1/2019 | Lee | H04N 13/243 |
| 2019/0260978 | A1* | 8/2019 | Guérin | G06T 5/94 |
| 2021/0289118 | A1* | 9/2021 | Guérin | H04N 23/698 |

* cited by examiner

AUTO EXPOSURE FOR SPHERICAL IMAGES

CROSS REFERENCE TO RELATED APPLICATION(S)

This disclosure is a continuation of U.S. patent application Ser. No. 18/388,472, filed Nov. 9, 2023, which is a continuation of U.S. patent application Ser. No. 17/713,606, filed Apr. 5, 2022, now U.S. Pat. No. 11,825,179, which is a continuation of U.S. patent application Ser. No. 16/994,264, filed Aug. 14, 2020, now U.S. Pat. No. 11,323,603, which claims priority to and the benefit of U.S. Provisional Patent Application Ser. No. 62/901,857, filed Sep. 18, 2019, the entire disclosures of which are herein incorporated by reference.

TECHNICAL FIELD

This disclosure relates to systems and techniques for auto exposure processing for spherical images.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be processed and then stored or output. In some cases, the ISP may be used to capture multiple images or video frames which are spatially adjacent or otherwise include overlapping content. Each of the multiple images may be captured using a different image sensor and according to different configurations for the image sensor.

SUMMARY

Disclosed herein are implementations of systems and techniques for auto exposure processing for spherical images.

One aspect of this disclosure is an image capture device. The image capture device comprises a first image sensor, a second image sensor, a processor, and a memory including instructions executable by the processor to produce a spherical image. The instructions include instructions to obtain a first image using the first image sensor and a second image using the second image sensor, obtain auto exposure control statistics for the first and second images, determine luminance values for the first and second images using the auto exposure control statistics, determine an average global luminance value for the spherical image to produce using the luminance values, determine delta luminance values for the first and second images using the average global luminance value, update the first and second images using the delta luminance values, and produce the spherical image using the updated first and second images.

Another aspect of this disclosure is an image processor. The image processor comprises one or more processing block units configured to determine luminance values for first and second hemispherical images using auto exposure control statistics obtained for the first and second hemispherical images, determine an average global luminance value using the luminance values, determine delta luminance values for the first and second hemispherical images using the average global luminance value, update the first and second hemispherical images using the delta luminance values, and produce a spherical image using the updated first and second hemispherical images.

Yet another aspect of this disclosure is a method. The method comprises obtaining first and second images using first and second image sensors, determining luminance values for the first and second images based on configurations of the first and second image sensors, updating the first and second images according to delta luminance values determined for the first and second images using the luminance values and producing a spherical image using the updated first and second images.

These and other aspects of this disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
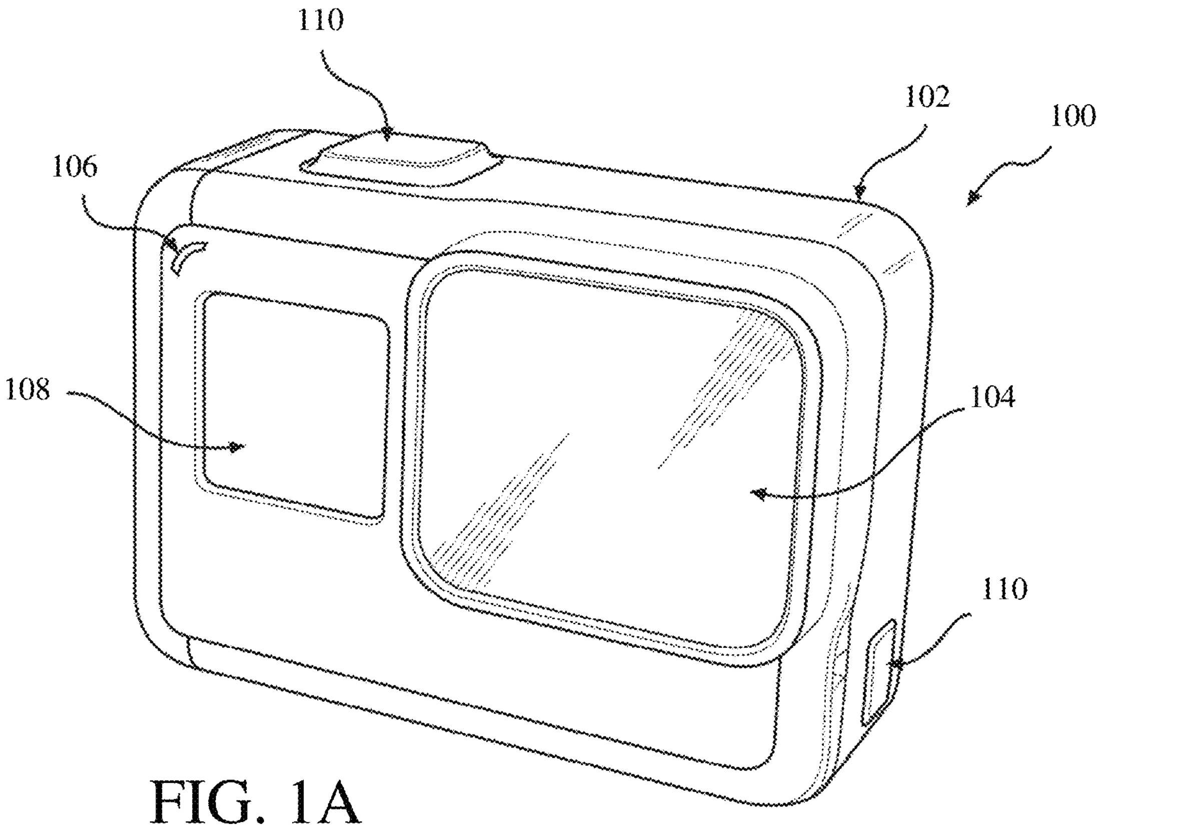
FIGS. 1A-D are isometric views of an example of an image capture device.

Image capture devices are designed with numerous features to assists users in producing high quality images. One example of such a feature is the ability to combine two or more images into a single, composite image. A typical example of a composite image is a two-dimensional panoramic image, which is typically produced by horizontally combining two images to show a larger scene than could be shown by a single image alone. Combining two or more subject images to produce a composite image requires careful processing of those images, such as to ensure that the juxtaposed portions of each respective subject image are aligned properly and with minimal distortion.

One approach to combining images in this way is image stitching. Image stitching is the process of combining multiple images with overlapping fields-of-view to produce a composite image. Image stitching may include aligning the pixels of two images being combined in a region along a boundary between sections of a composite image that are respectively based on two different input images. The resulting line or lines of pixels forming the overlapping portion between those two images is referred to as a stitch line. The stitching may be passively performed (e.g., by a processing component of the image capture device or another device), such as automatically upon the capturing of the subject images. Alternatively, the stitching may be in response to user intervention, such as by a user of the image capture device selecting to combine the subject images.

Another example of a composite image which may be produced using image stitching is a spherical image, which may also be referred to as a 360 degree image. A spherical image is a composite image formed by stitching two or more images, captured using two or more image sensors having overlapping fields of view, such that the resulting image shows a complete 360 degree field-of-view around the image capture device used to capture those two or more images. For example, a spherical image may be produced by stitching two or more images captured using fisheye lenses. Improvements in image capture technology have made spherical images increasingly popular. For example, spherical images are frequently used to show a full environmental rendering of a scene, such as to immerse a viewer in the environment. In another example, spherical images are used to produce virtual reality experiences.

As with conventional two-dimensional images, spherical images may be processed using one or more techniques to identify and/or enhance the content thereof. One example of such processing is for auto exposure, in which a light exposure level used by an image sensor to capture an image is automatically adjusted based on lighting and related conditions of a scene in the direction of the image sensor. The exposure level can be set by adjusting the aperture, the shutter speed, and/or other aspects of the image sensor or of the image capture device which are used by the image sensor to capture an image. In the context of spherical images, in which an image capture device can be considered to include a rear image sensor and a front image sensor, auto exposure is conventionally processed separately for each of the rear image sensor and the front image sensor.

However, that conventional approach may suffer from drawbacks. In particular, the separate auto exposure processing for the rear and front image sensors may result in poor image quality for the spherical image ultimately produced using those image sensors. For example, a scene facing the front image sensor may be very dark while a scene facing the rear image sensor may be very bright. In such a case, the front and rear image sensors would use very different exposure levels for the image capture, resulting in a local exposure variation visible along the stitch line of the spherical image. Even where the hemispherical images are compensated according to the different exposure levels, there is likely to be a local exposure variation visible along the stitch line of the spherical image, particularly where the signal to noise ratio (SNR) for each image sensor is different and/or where there are large number of image details along the stitch line. Similarly, using a similar auto exposure value for each of the front and rear image sensors where the respective scene brightness levels are different may result in poor dynamic range for the spherical image Implementations of this disclosure address problems such as these using auto exposure processing for spherical images, including by pre-processing to update auto exposure configurations used to capture images which are later combined to produce a spherical image or by post-processing to update luminance values of captured images before those images are combined to produce a spherical image. In implementations which describe the pre-processing, an average global luminance value is determined based on auto exposure configurations of the image sensors, delta luminance values are determined for each of the image sensors based on the average global luminance value and a luminance variance between the image sensors, the auto exposure configurations are updated using the delta luminance values, the images are captured using the updated auto exposure configurations, and the spherical image is produced by combining the captured images. In implementations which describe the post-processing, an average global luminance value is determined for a spherical image to be produced using the images, luminance values are determined for each of the images, delta luminance values are determined for each of the images based on the average global luminance value and the luminance values, the images are updated using the delta luminance values, and the spherical image is produced based on the updated images.

The implementations of this disclosure are described in detail with reference to the drawings, which are provided as examples so as to enable those skilled in the art to practice the technology. The figures and examples are not meant to limit the scope of the present disclosure to a single implementation, and other implementations are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
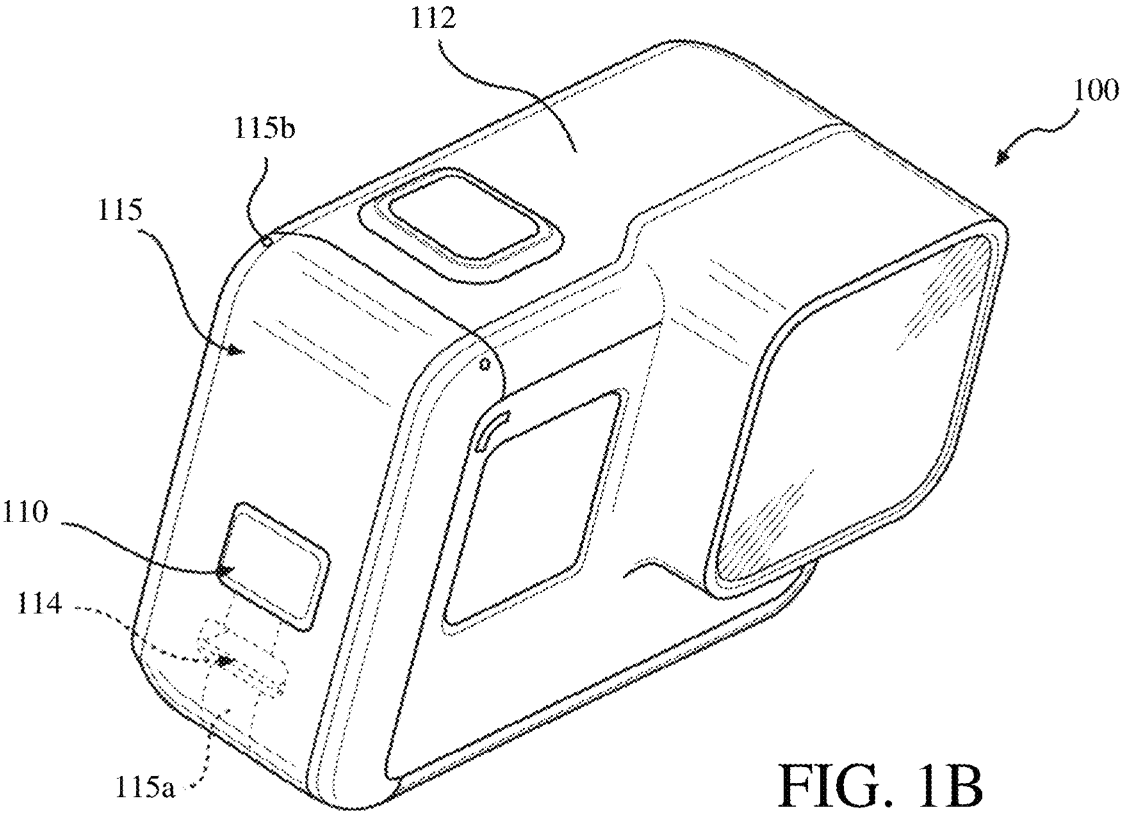
Figure 1C:
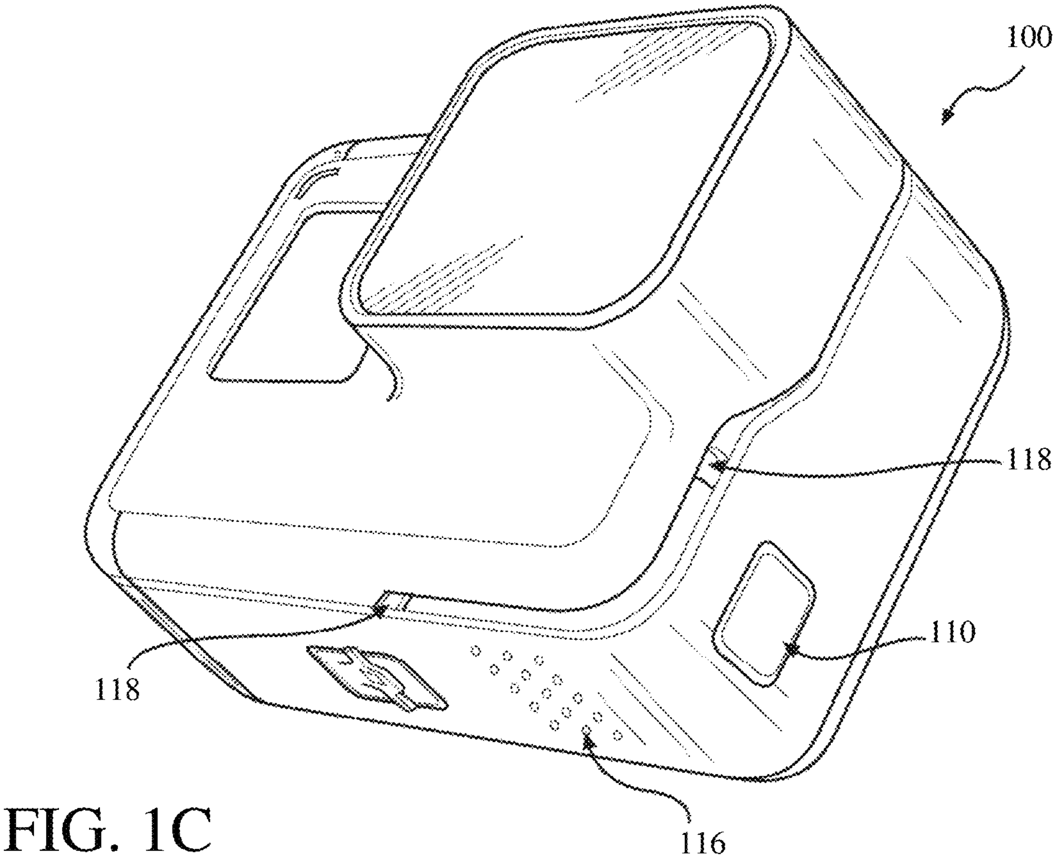
Figure 1D:
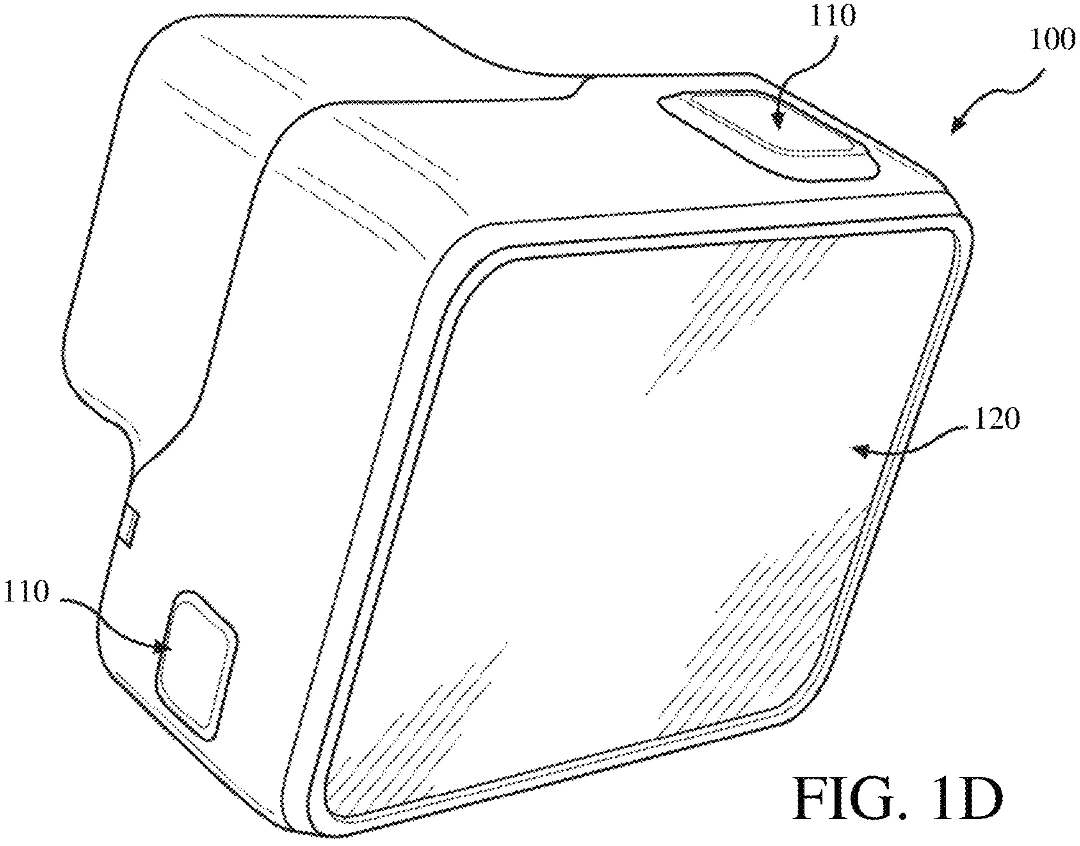

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115*a* (e.g., hidden as indicated using dotted lines) that is opened by engaging the associated button 110 as shown.

The removable door 115 can also be secured to the image capture device 100 using a hinge mechanism 115*b*, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115*a* and the hinge mechanism 115*b* allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
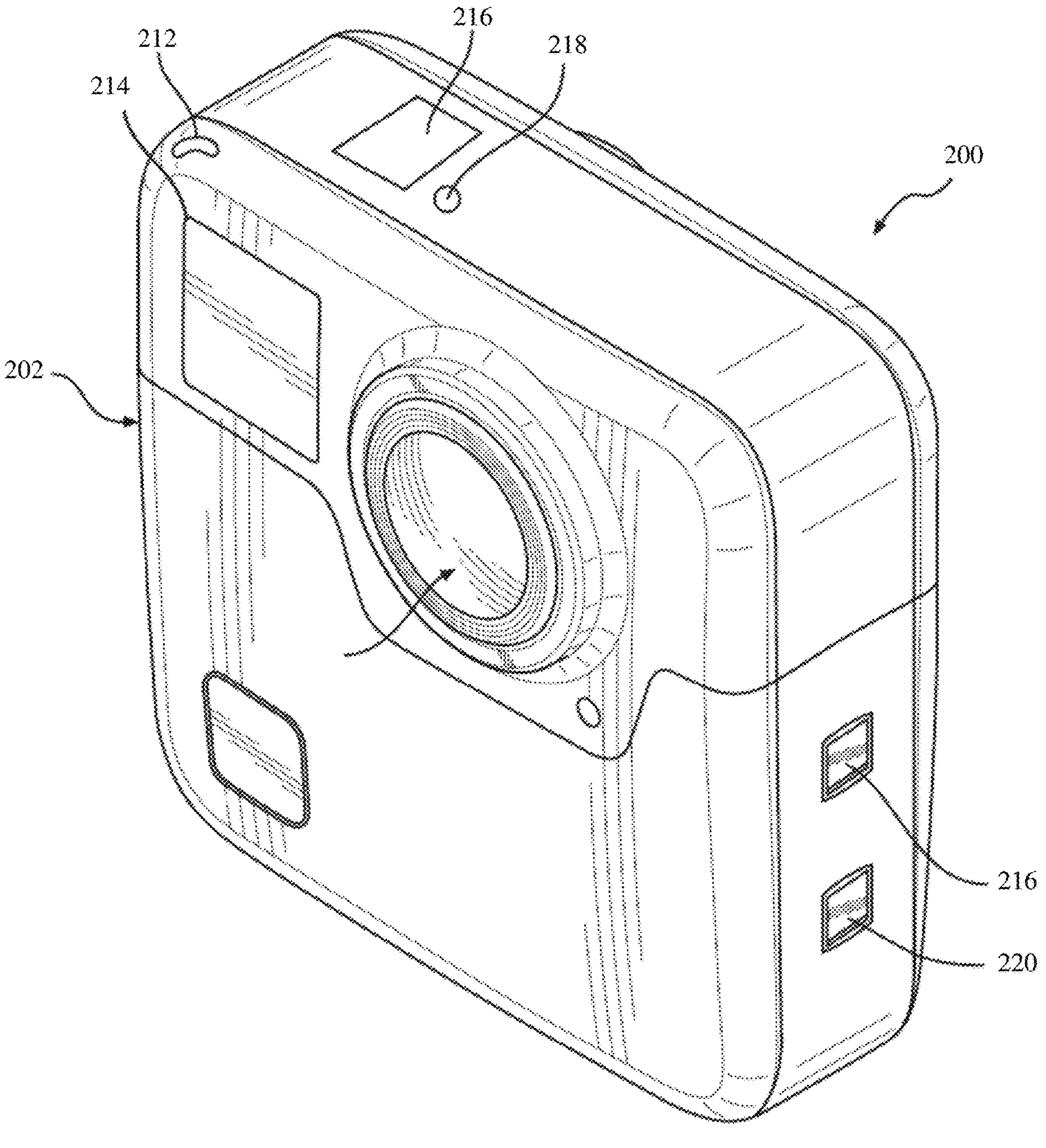
FIGS. 2A-B are isometric views of another example of an image capture device.
Figure 2B:
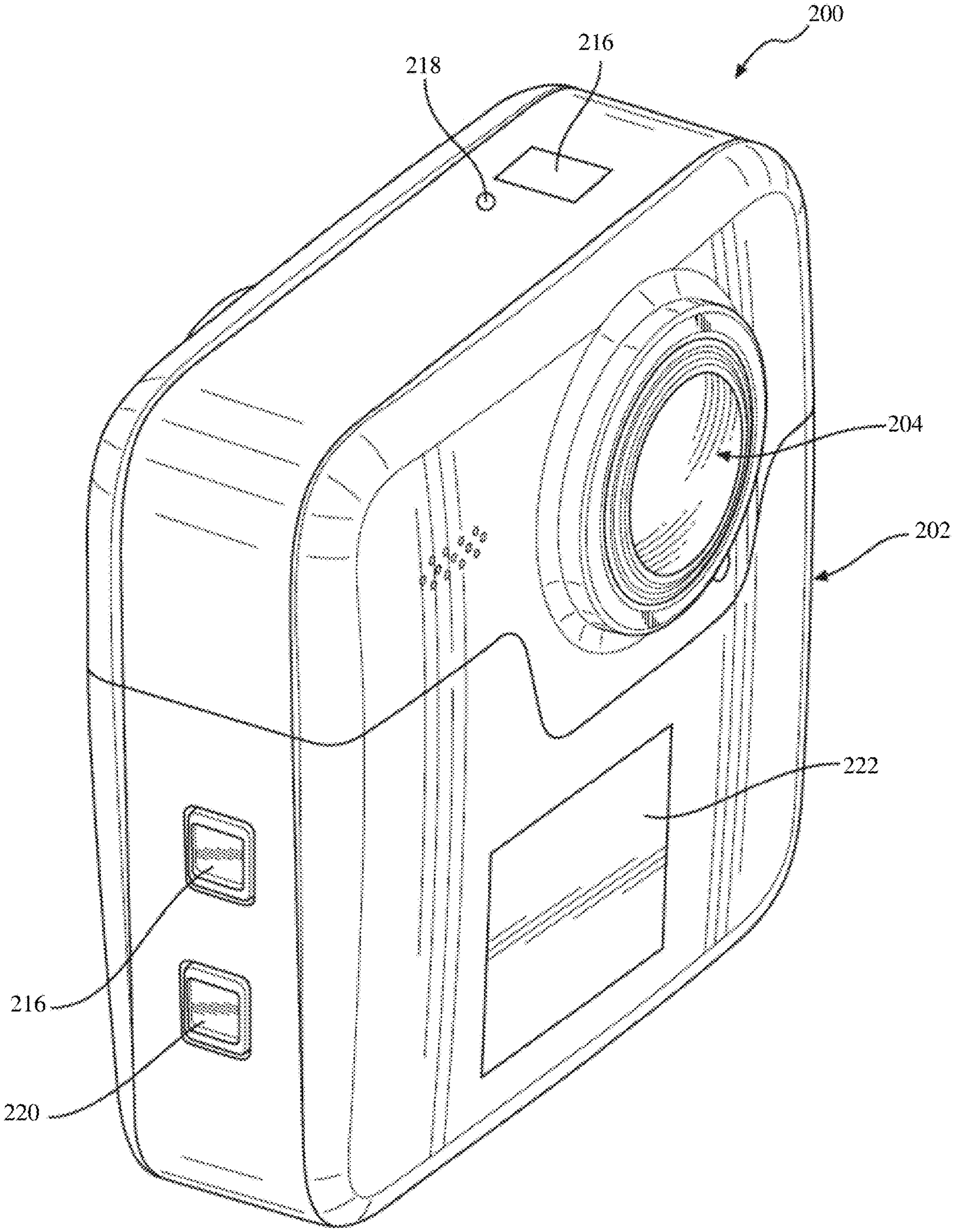

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
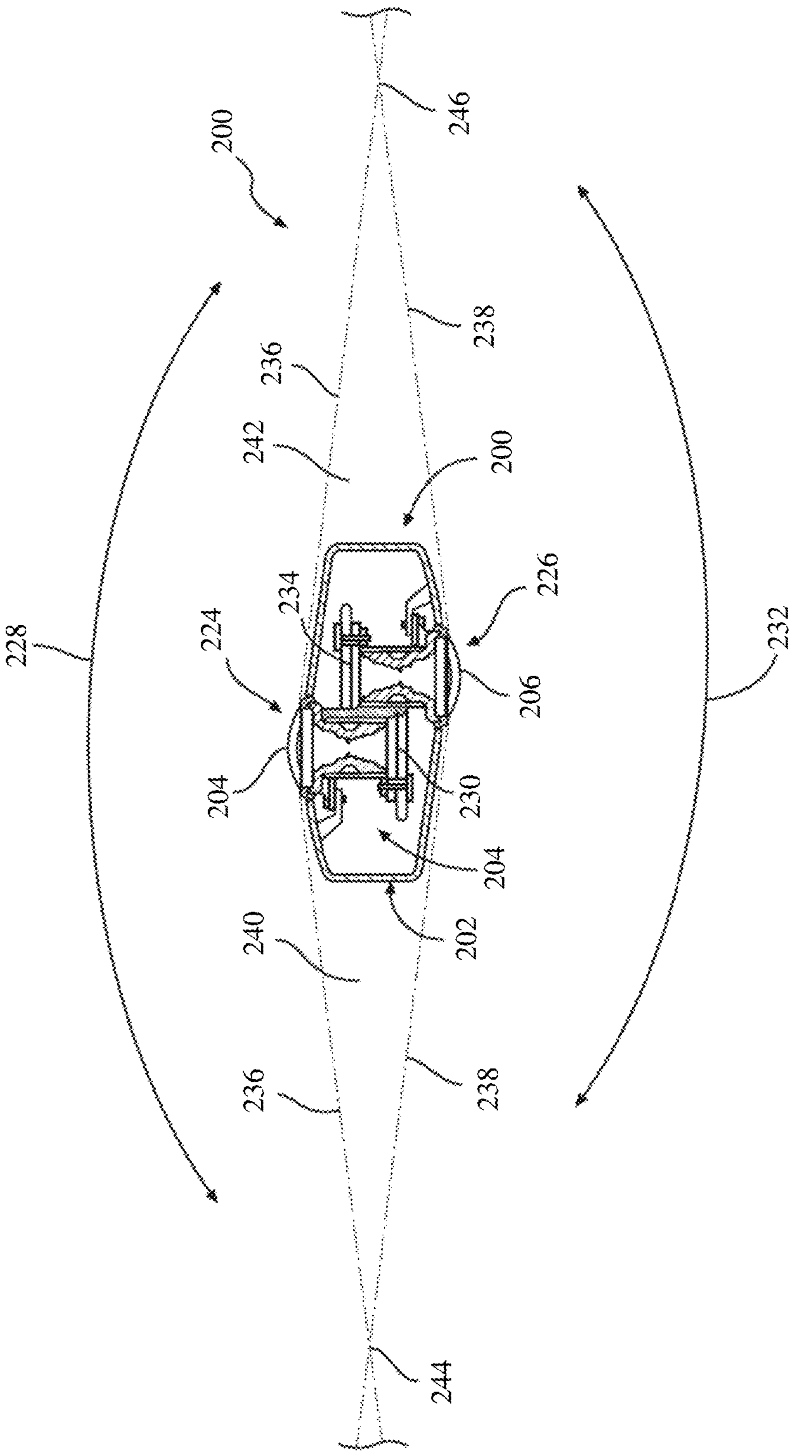
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 3B:
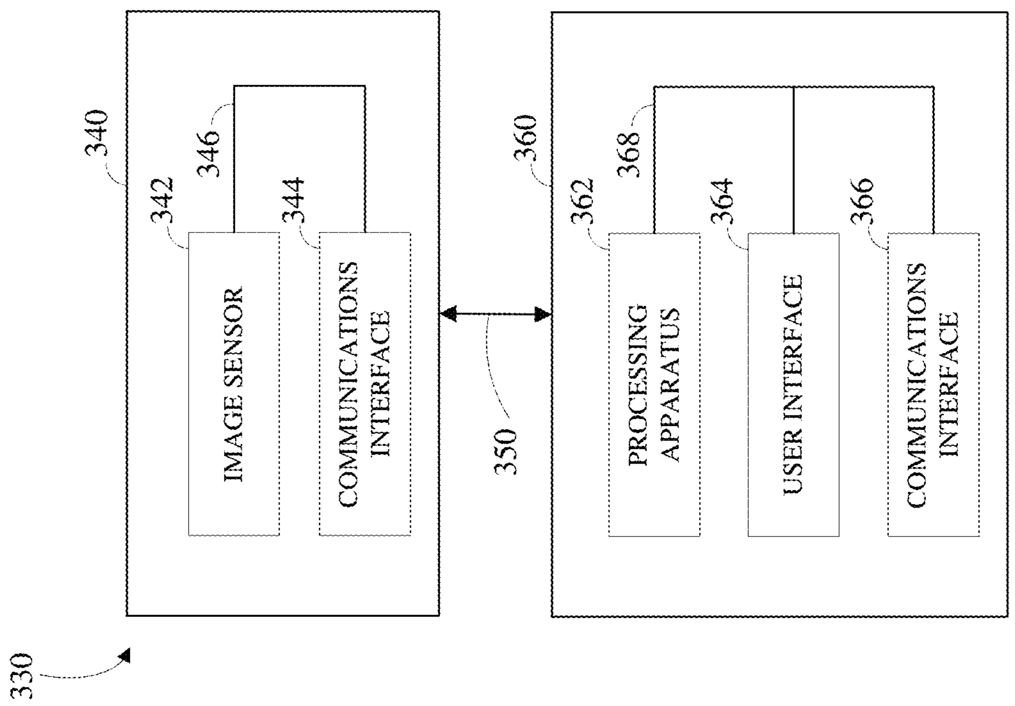
FIGS. 3A-B are block diagrams of examples of image capture systems.
Figure 3A:
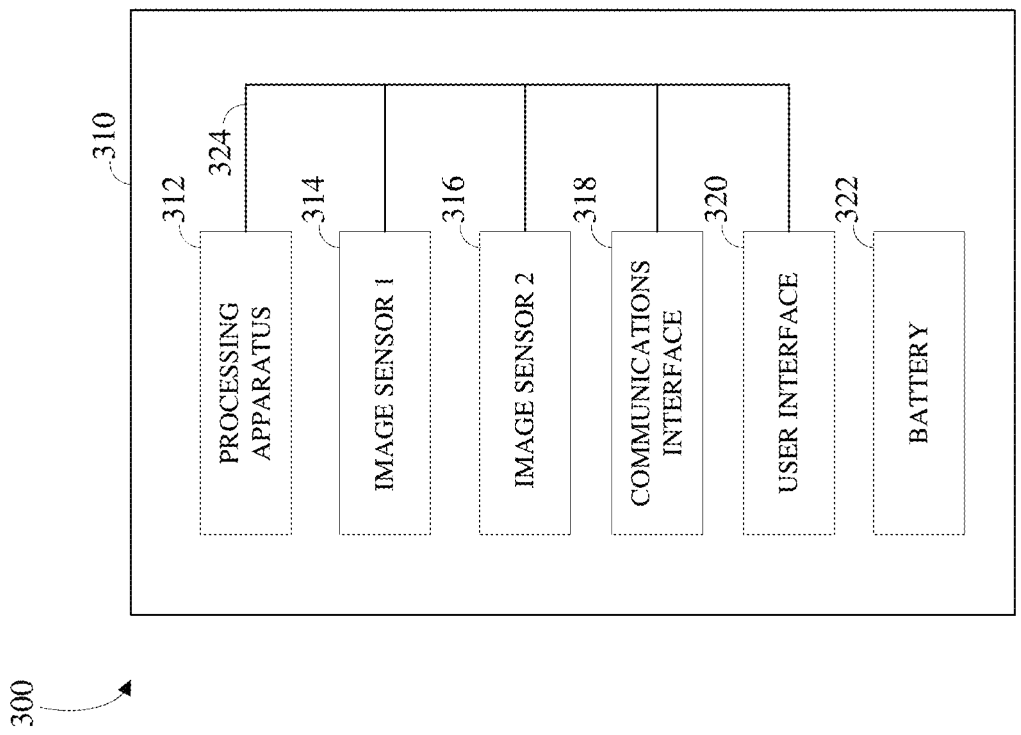

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 8:
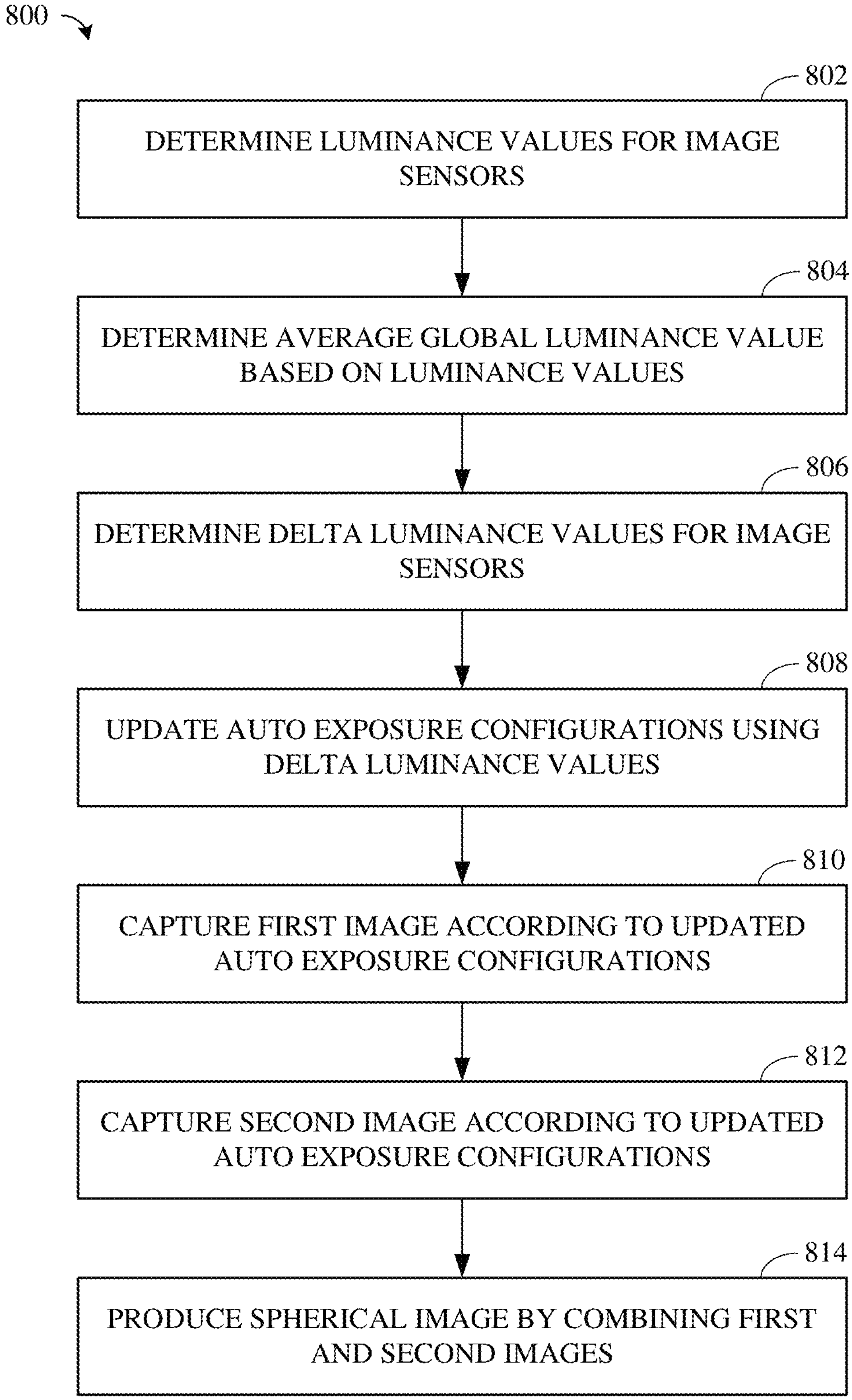
FIGS. 8-9 are flowcharts showing examples of techniques for auto exposure processing for spherical images.
Figure 9:
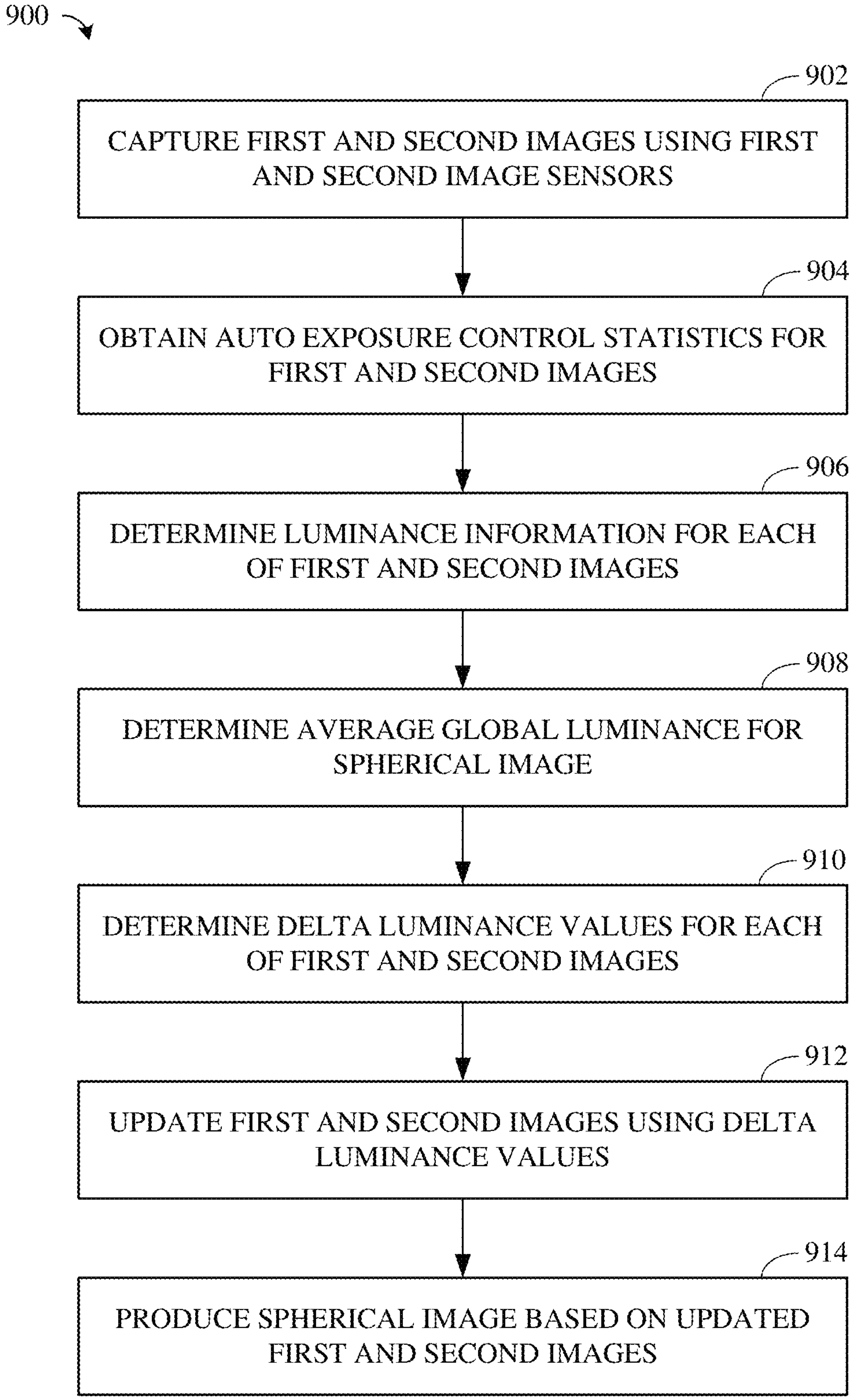

The image capture system 300 may be used to implement some or all of the techniques described in this disclosure, such as the technique 800 and/or the technique 900, respectively described with respect to FIGS. 8-9.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure, such as the technique 800 and/or the technique 900, respectively described with respect to FIGS. 8-9.

Figure 4:
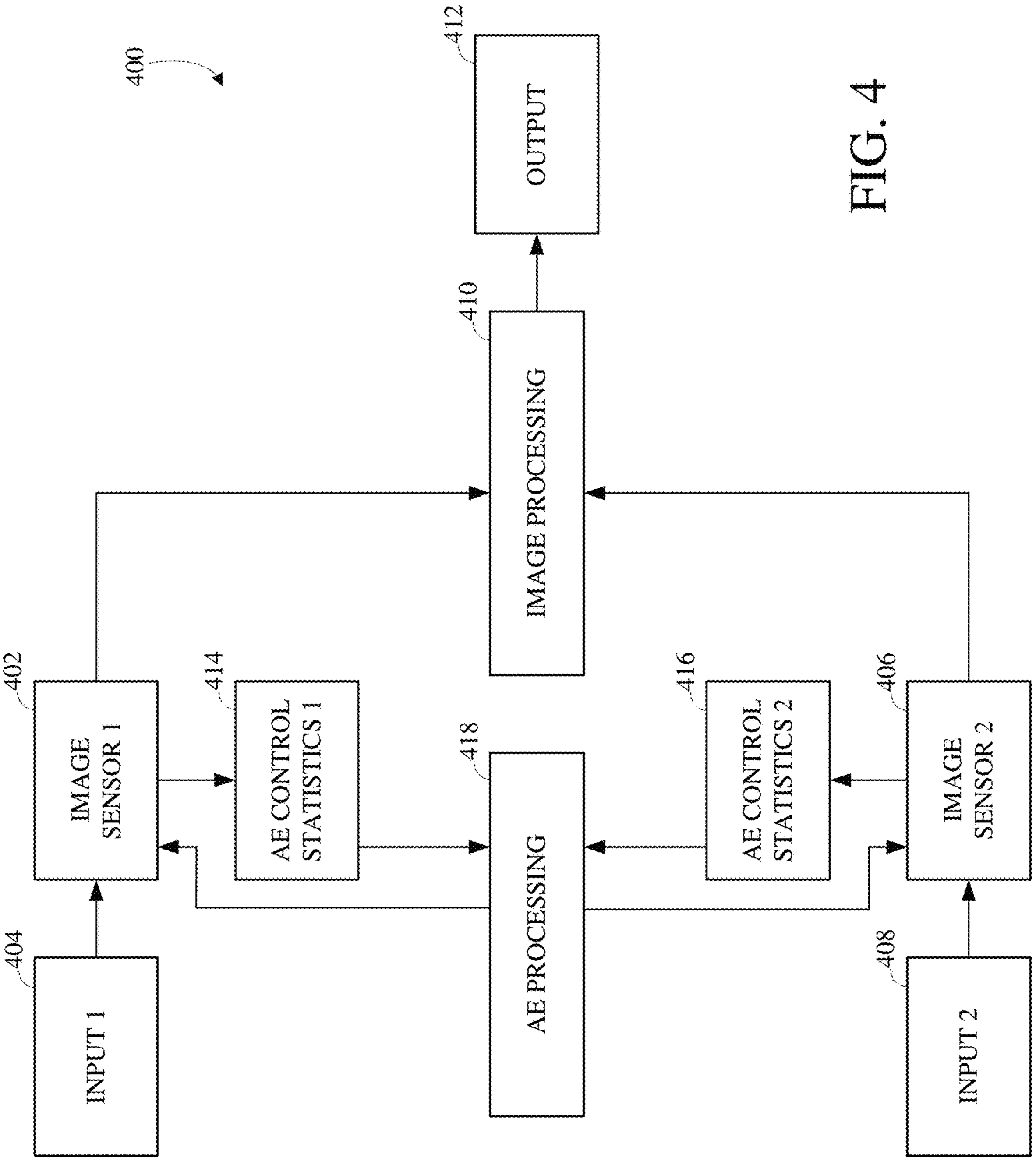
FIGS. 4-5 are block diagrams of examples of an image capture and processing pipeline.
Figure 5:
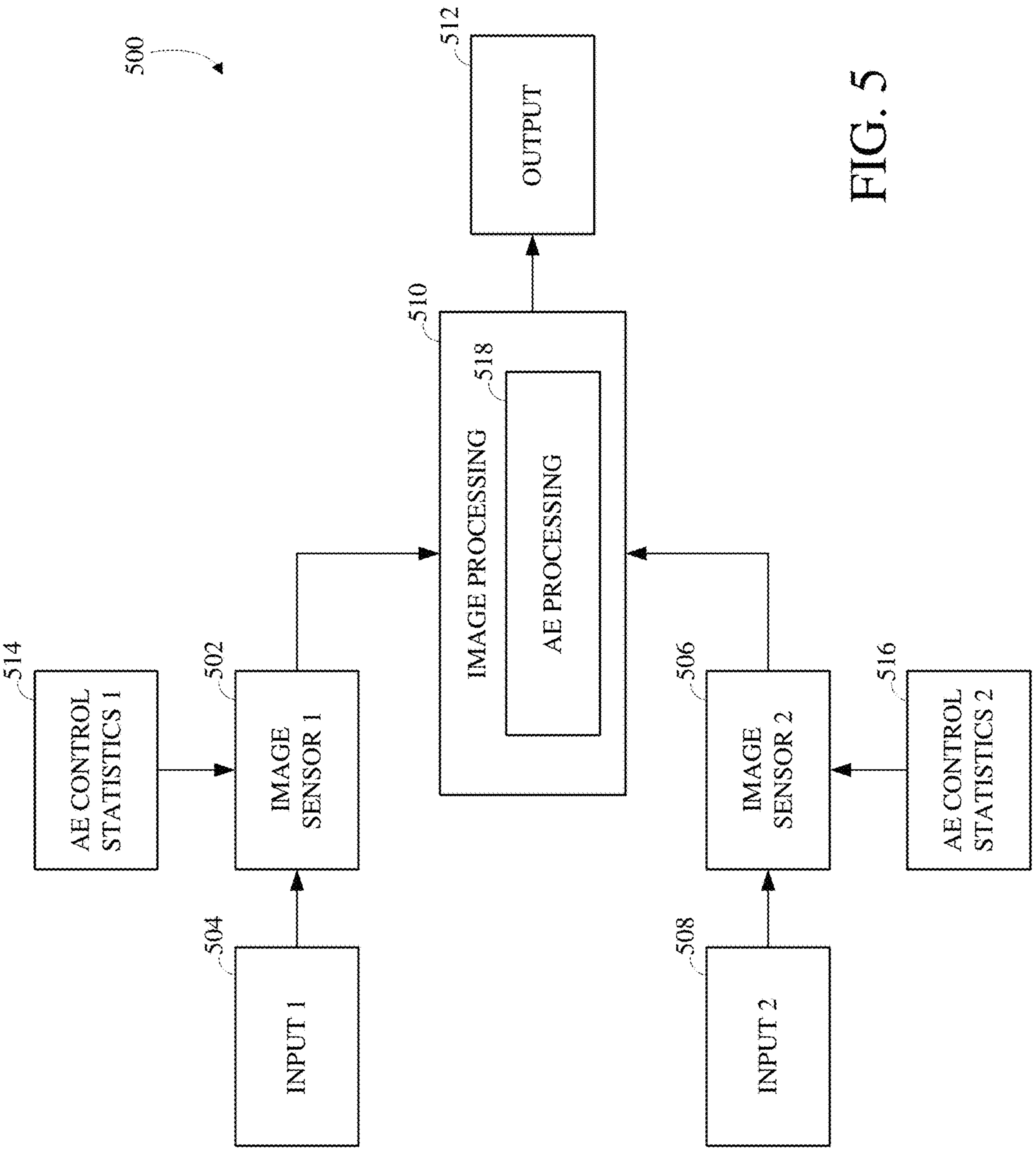

FIGS. 4-5 are block diagrams of examples of an image capture and processing pipeline. Referring first to FIG. 4, a first example of an image capture and processing pipeline 400 is shown. The pipeline 400 is implemented by an image capture device, which may, for example, be the image capture device 100 shown in FIGS. 1A-D, the image capture device 200 shown in FIGS. 2A-C, or another image capture device. In some implementations, some or all of the pipeline 400 may represent functionality of a DSP and/or an ASIC, for example, including an image capture unit, an image processing unit, or a combined image capture and processing unit.

The pipeline 400 includes a first image sensor 402 that captures a first image based on first input 404, a second image sensor 406 that captures a second image based on second input 408, and an image processing unit 410 that processes the first image and the second image to produce output 412. The first input 404 includes measurements and/or other information related to a scene which may be captured as an image using the first image sensor 402. The second input 408 includes measurements and/or other information related to a scene which may be captured as an image using the second image sensor 406. The output 412 may be a spherical image produced as a result of the processing performed by the image processing unit 410. Alternatively, the output 412 may refer to information usable to produce a spherical image.

The first image sensor 402 and the second image sensor 406 may be image sensors of an image capture device. For example, the first image sensor 402 or the second image sensor 406 may be one or more of an image sensor of the image capture device 100, an image sensor of the image capture device 200 (e.g., the image sensor 240 or the image sensor 242), an image sensor of the image capture device 300 (e.g., the first image sensor 314 or the second image sensor 316), or an image sensor of the image capture device 340 (e.g., the first image sensor 342 or the second image sensor 344). The first image sensor 402 and the second image sensor 406 may be controlled independently. Alternatively, the controlling of one of first image sensor 402 or of the second image sensor 406 may be dependent upon the controlling of the other.

In particular, the first image sensor 402 and the second image sensor 406 may be different image sensors of a same image capture device, in which the first image sensor 402 and the second image sensor 406 each captures a hemispherical image which, when combined with the other hemispherical image, may be processed to produce a spherical image (e.g., as the output 412). For example, the input 404 and the input 408 may refer to information used by 360 degree field-of-view image sensors, such as where each of the images is produced based on a greater than 180 degree field-of-view. In another example, the input 404 and the input 408 may refer to information used to generate images using image sensors with other fields-of-view.

The capturing of the first image using the image sensor 402 and of the second image using the image sensor 406 may be responsive to a user of an image capture device implementing the pipeline 400 indicating to capture an image, for example, by the user interacting with an interface element of the image capture device which causes images to be captured by the first image sensor 402 and by the second image sensor 406. Alternatively, the capturing of the image using the image sensor 406 may be automated based on one or more configurations of the first image sensor 402 and of the second image sensor 406.

The pipeline 400 includes a first auto exposure control statistics unit 414 and a second auto exposure control statistics unit 416. The first auto exposure control statistics unit 414 obtains, such by generating or determining, auto exposure control statistics based on the capturing of the first image using the first image sensor 402. The second auto exposure control statistics unit 416 obtains, such by generating or determining, auto exposure control statistics based on the capturing of the second image using the second image sensor 406. The first auto exposure control statistics unit 414 obtains information about an aperture and/or shutter speed of the first image sensor 402 used to capture the first image. The second auto exposure control statistics unit 416 obtains information about an aperture and/or shutter speed of the second image sensor 406 used to capture the second image.

The output of the first auto exposure control statistics unit 414 and of the second auto exposure control statistics unit 416 may indicate luminance values for the first image sensor 402 and the second image sensor 406, respectively. For example the output of the first auto exposure control statistics unit 414 and of the second auto exposure control statistics unit 416 may represent luminance values based on auto exposure configurations of the first image sensor 402 and the second image sensor 406. An auto exposure processing unit 418 may use output of the first auto exposure control statistics unit 414 and of the second auto exposure control statistics unit 416 to determine whether and how to adjust the auto exposure configurations of the first image sensor 402 and/or of the second image sensor 406. The first image sensor 402 and the second image sensor 406, after the updating of the auto exposure configurations thereof, may be used to capture the first image and the second image, respectively.

The updating of the auto exposure configurations of the first image sensor 402 and the second image sensor 406 may result in the first image and the second image being captured with luminance values that, when the first image and the second image are combined to produce the spherical image, result in reduced or eliminated local exposure variation which would otherwise have been visible along the stitch line of the spherical image. For example, the auto exposure processing unit 418 may determine luminance values for each of the first image sensor 402 and the second image sensor 406, determine an average global luminance value based on the auto exposure configurations for each of the first image sensor 402 and the second image sensor 406 (e.g., based on or otherwise using the luminance values for the first image sensor 402 and the second image sensor 406), determine delta luminance values for each of the first image sensor 402 and the second image sensor 406 based on the average global luminance value and the luminance values, and update the auto exposure configurations of the first image sensor 402 and/or of the second image sensor 406 using the delta luminance values.

After the auto exposure configurations of the first image sensor 402 and/or of the second image sensor 406 are updated, the first image sensor 402 uses its updated auto exposure configurations to capture the first image and the second image sensor 406 uses its updated auto exposure configurations to capture the second image. The first image and the second image are then received and processed at the image processing unit 410, such as to produce the output 412 based on the first image and the second image, such as by combining the first image and the second image along a stitch line. The image processing unit 410 may represent one or more hardware components and/or software processes used to process the first image and the second image to produce the output 412.

In some implementations of the pipeline 400, the first auto exposure control statistics unit 414 and the second auto exposure control statistics unit 416 may be combined with or otherwise integrated into the auto exposure processing unit 418. For example, a single software unit may including functionality of the image capture device for processing auto exposure information for each of the first image sensor 402 and the second image sensor 406 as well as for processing and adjusting, as appropriate, auto exposure parameters used to produce a spherical image as the output 412 based on the first image captured using the first image sensor 402 and the second image captured using the second image sensor 406.

Referring next to FIG. 5, a second example of an image capture and processing pipeline 500 is shown. The pipeline 500 is implemented by an image capture device, which may, for example, be the image capture device 100 shown in FIGS. 1A-D, the image capture device 200 shown in FIGS. 2A-C, or another image capture device. In some implementations, some or all of the pipeline 500 may represent functionality of a DSP and/or an ASIC, for example, including an image capture unit, an image processing unit, or a combined image capture and processing unit.

Similar to the pipeline 400 shown in FIG. 4, the pipeline 500 includes a first image sensor 502 that captures a first image based on first input 504, a second image sensor 506 that captures a second image based on second input 508, an image processing unit 510 that processes the first image and the second image to produce output 512, a first auto exposure control statistics unit 514 that obtains auto exposure information for the first image sensor 502, a second auto exposure control statistics unit 516 that obtains auto exposure information for the second image sensor 506, and an auto exposure processing unit 518.

The first image sensor 502, the first input 504, the second image sensor 506, the second input 508, the image processing unit 510, the output 512, the first auto exposure control statistics unit 514, the second auto exposure control statistics unit 516, and the auto exposure processing unit 518 may respectively be the first image sensor 402, the first input 404, the second image sensor 406, the second input 408, the image processing unit 410, the output 412, the first auto exposure control statistics unit 414, the second auto exposure control statistics unit 416, and the auto exposure processing unit 418 shown in FIG. 4. Accordingly, the pipeline 500 may represent similar processing functionality as in the pipeline 400.

However, different from the auto exposure processing unit 418 of the pipeline 400, which is external to the image processing unit 410 of the pipeline 400, the auto exposure processing unit 518 is internal to the image processing unit 510. As such, the auto exposure processing unit 518 may represent image post-processing functionality for adjusting luminance and/or related aspects of the first image and the second image after they are captured. The first image captured using the first image sensor 502, the second image captured using the second image sensor 506, and/or the spherical image ultimately produced using the first image and the second image may be processed and, as appropriate, adjusted as a post-capture processing step performed at the image processing unit 510.

For example, the auto exposure processing unit 518 may determine luminance values for each of the first image and the second image, determine an average global luminance value for a spherical image to be produced using the luminance values, determine delta luminance values for each of the first image and the second image based on the average global luminance value and the luminance values, and update the first image and the second image using the delta luminance values. As such, the auto exposure processing unit 518 may take as input the initial values of such information and, as appropriate, adjust such information. Other units of the image processing unit 510 may then use the adjusted information output by the auto exposure processing unit 518 (e.g., the first and second images with updated luminance values) to produce the spherical image as the output 512.

The units of the image processing unit 510 may be ordered in a sequence to produce the output 512 based on input received or otherwise processed at a first unit of the image processing unit 510. In some implementations, the auto exposure processing unit 518 may be a first unit of the image processing unit 510. For example, the auto exposure processing unit 518 may process the first image, the second image, and the auto exposure information obtained using the first auto exposure control statistics unit 514 and the second auto exposure control statistics unit 516 before other operations for producing the output 512. In some implementations, the auto exposure processing unit 518 may be a last unit of the image processing unit 510. For example, the processing of the first image, the second image, and the auto exposure information obtained using the first auto exposure control statistics unit 514 and the second auto exposure control statistics unit 516 may represent the final operations performed to produce the output 512. In some implementations, the auto exposure processing unit 518 may be ordered other than as the first unit or the last unit of the image processing unit 510.

Figure 6:
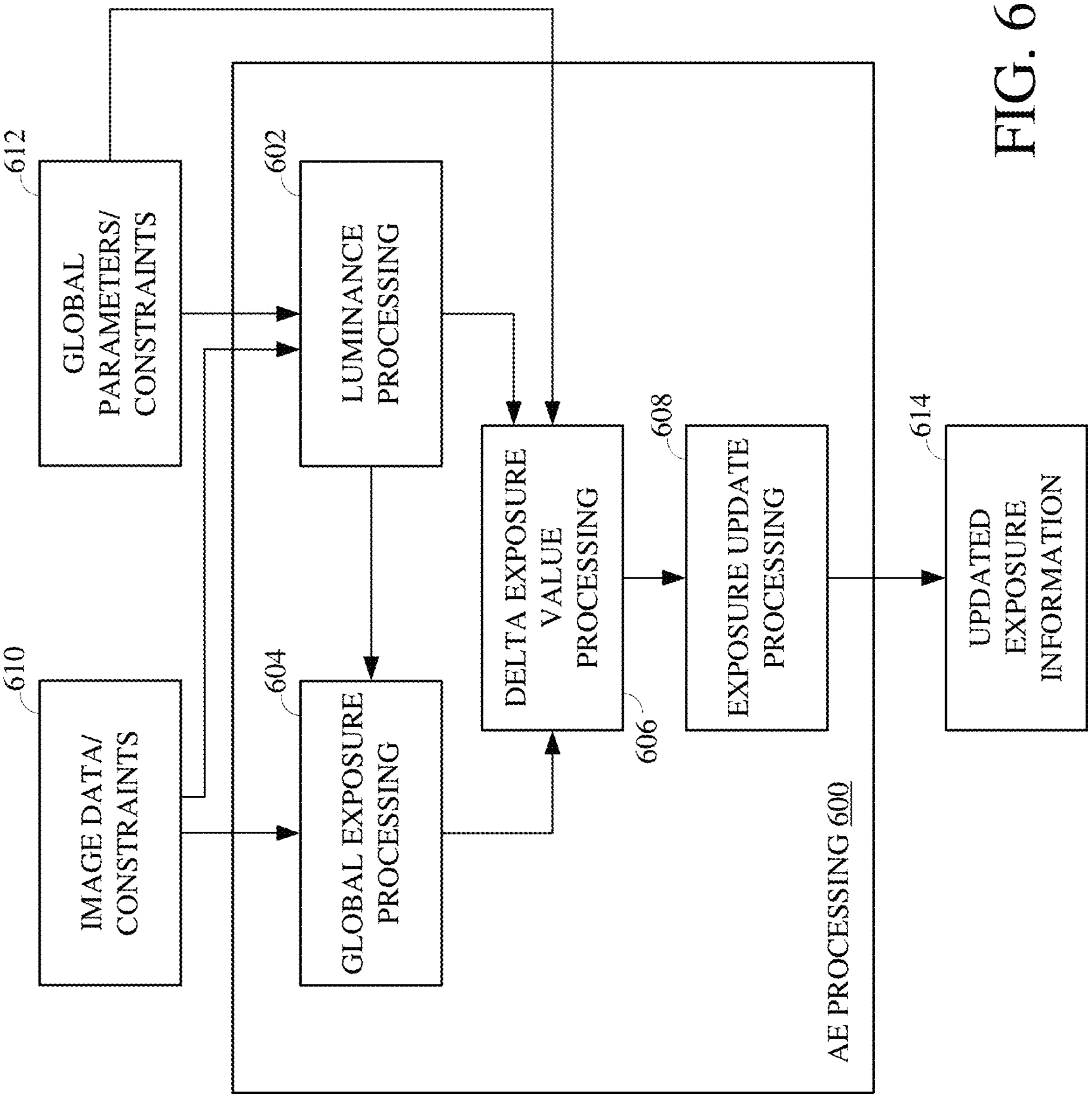
FIGS. 6-7 are block diagrams of examples of an auto exposure processing unit of an image capture and processing pipeline.
Figure 7:
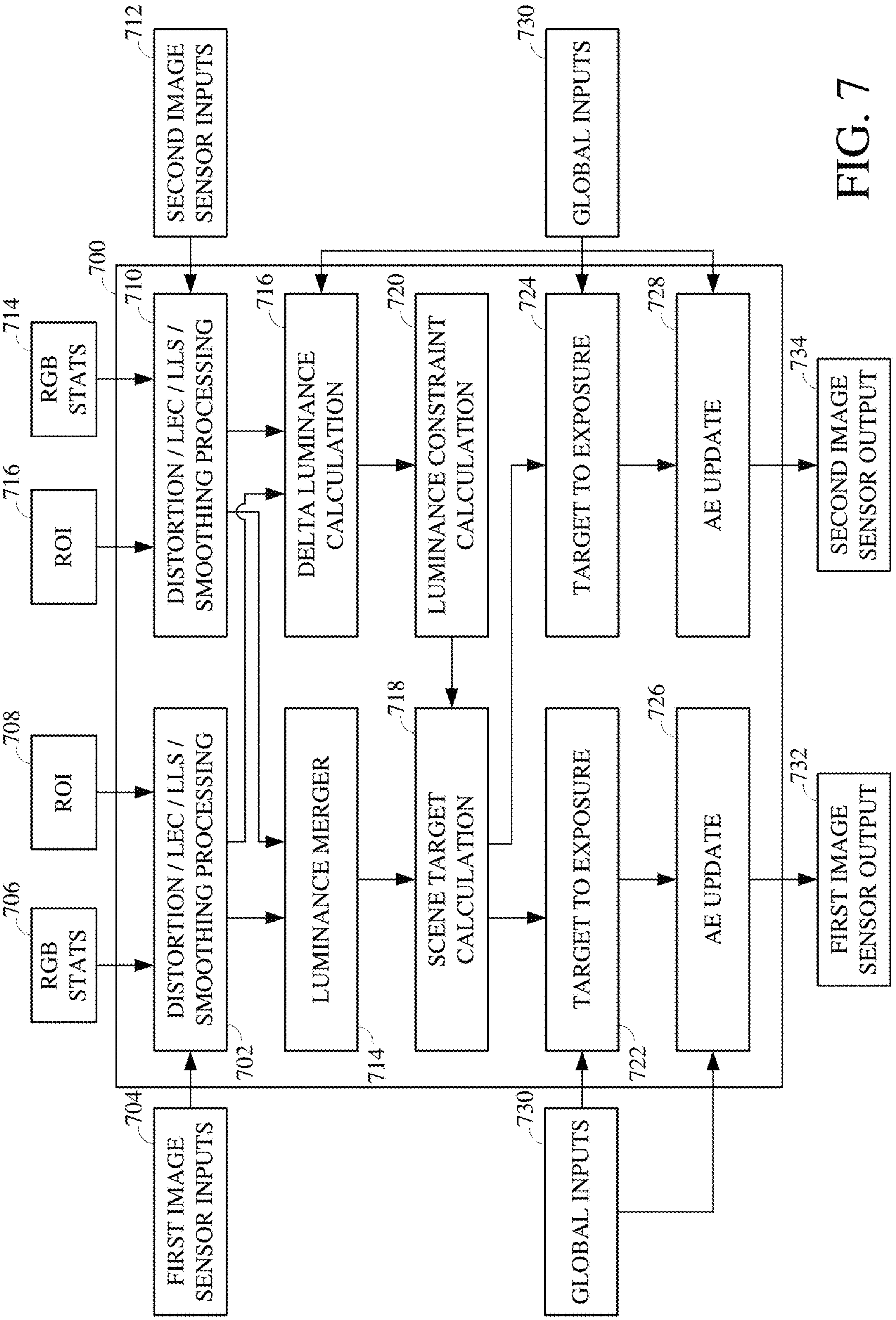

FIGS. 6-7 are block diagrams of examples of an auto exposure processing unit of an image capture and processing pipeline. Referring first to FIG. 6, a first example of an auto exposure processing unit 600 is shown. The auto exposure processing unit 600 may be the auto exposure processing unit 418 shown in FIG. 4, the auto exposure processing unit 518 shown in FIG. 5, or another auto exposure processing unit. The auto exposure processing unit 600 includes a luminance processing unit 602, a global exposure processing unit 604, a delta exposure value processing unit 606, and an exposure update processing unit 608. The auto exposure processing unit 600 receives as input image data and constraints 610 and global parameters and constraints 612. The auto exposure processing unit 600 outputs updated exposure information 614.

The input image data and constraints 610 may include information associated with the first image, the second image, the first image sensor, and/or the second image sensor. In some implementations, the input image data and constraints 610 may include RGB statistics for each of the first image and the second image, region of interest (ROI) statistics for each of the first image and the second image, constraints for the first image sensor, and constraints for the second image sensor. In some implementations, the constraints for the first image sensor and the constraints for the second image sensor are local constraints and may include local luminance shading (LLS) radial profile information, LLS and local exposure compensation (LEC) map information, radial weights, expotime/gain information, and a smoothing coefficient.

The global parameters and constraints 612 are parameters and constraints which are globally applied against the first image and the second image. In some implementations, the global parameters and constraints 612 may include a threshold representing a maximum exposure variance between the first image sensor and the second image sensor, a luminance variance smoothing coefficient, expotime/gain shape and constraints, and exposure value bias and constraints.

The luminance processing unit 602, the global exposure processing unit 604, the delta exposure value processing unit 606, and the exposure update processing unit 608 process the image data and constraints 610 and/or the global parameters 612, directly or indirectly, to produce the updated exposure information 614. The particular processing performed using the global exposure processing unit 604, the luminance processing unit 602, the delta exposure value processing unit 606, and the exposure update processing unit 608 may be based on whether the auto exposure processing unit 600 is pre-processing auto exposure information or post-processing auto exposure information.

Where the auto exposure processing unit 600 is pre-processing auto exposure information, the luminance processing unit 602 determines luminance values for each of those image sensors (e.g., based on auto exposure configurations of the image sensors of the image capture device), the global exposure processing unit 604 determines an average global luminance value based on the luminance values, the delta exposure value processing unit 606 determines delta luminance values for each of those image sensors based on the average global luminance value and the luminance values, and the exposure update processing unit 608 updates the auto exposure configurations of those image sensors using the delta luminance values. In such a case, the updated exposure information 614, as the output of the auto exposure processing unit 600, may represent commands which may be processed by hardware of the image capture device implementing the auto exposure processing unit 600, such as to cause a change in auto exposure configurations for one or more image sensors thereof based on the processed values.

Alternatively, where the auto exposure processing unit 600 is post-processing auto exposure information, the luminance processing unit 602 determines luminance values for each of the first image and the second image, each as hemispheres of the spherical image 614 to be produced. The global exposure processing unit 604 determines an average global luminance value as an average of smoothed luminance values of the first image and the second image. The delta exposure value processing unit 606 determines delta luminance values based on the luminance values for the first image and the second image. The exposure update processing 608 updates the luminance values for the first image and/or for the second image based on the delta luminance values and based on the average global luminance value to produce the updated exposure information 614. In such a case, the updated exposure information 614, as the output of the auto exposure processing unit 600, may represent information which may be processed by an image processing unit of the image capture device implementing the auto exposure processing unit 600, such as to update luminance or related values of images captured using the image sensors of the image capture device.

In some implementations, the global exposure processing unit 604 may further determine a target luminosity for the entire scene to be rendered within the spherical image 614. For example, the target luminosity for the entire scene may be computed as a constraint that is later used by the exposure update processing unit 608 to determine whether exposure values are to be updated. For example, the exposure update processing unit 608 may check to determine whether the threshold value representing the target luminosity for the entire scene would be breached by the application of the delta luminance values. Where the threshold value would be breached, the exposure update processing unit 608 may discard the delta luminance values for the first image and/or for the second image. In such a case, the spherical image 614 is produced without changes in luminance values of the first image and/or the second image.

Referring next to FIG. 7, a second example of an auto exposure processing unit 700 is shown. The auto exposure processing unit 700 may be the auto exposure processing unit 418 shown in FIG. 4, the auto exposure processing unit 518 shown in FIG. 5, or another auto exposure processing unit. The auto exposure processing unit 700 includes a first distortion/LEC/LLS/smoothing processing unit 702 that processes first image sensor inputs 704 based on first RGB statistics 706 and first ROI information 708. The auto exposure processing unit 700 includes a second distortion/LEC/LLS/smoothing processing unit 710 that processes second image sensor inputs 712 based on second RGB statistics 714 and second ROI information 716.

The first image sensor inputs 704 and the second image sensor inputs 712 may be or include inputs described above with respect to the image data and constraints 610 shown in FIG. 6. For example, the first image sensor inputs 704 and the second image sensor inputs 712 may each include, for the respective image sensor of the image capture device, LLS radial profile information, LLS and LEC map information, radial weights, expotime/gain information, and a smoothing coefficient.

The first distortion/LEC/LLS/smoothing processing unit 702 and the second distortion/LEC/LLS/smoothing processing unit 710 each includes a set of subunits which perform different processing against the first image sensor inputs 704 or the second image sensor inputs 712. The first distortion/LEC/LLS/smoothing processing unit 702 and the second distortion/LEC/LLS/smoothing processing unit 710 may include subunits for processing individual aspects of the first image sensor inputs 704 and the second image sensor inputs 712.

For example, the first distortion/LEC/LLS/smoothing processing unit 702 and the second distortion/LEC/LLS/smoothing processing unit 710 may each include a LLS radial correction subunit that processes the LLS radial profile information, a LLS+LEC map correction subunit that processes the LLS and LEC map information, a compute weighted average subunit that processes the radial weights, a compute luminance subunit that processes the expotime/gain information, and a temporal smoothing subunit that performs temporal smoothing using the smoothing coefficient. The first distortion/LEC/LLS/smoothing processing unit 702 and the second distortion/LEC/LLS/smoothing processing unit 710 may each also include a RGB max subunit that maximizes the RGB statistics 706 and 714 and a ROI to weight map subunit that processes the ROI information 708 and 716 against a weight map.

The first distortion/LEC/LLS/smoothing processing unit 702 and the second distortion/LEC/LLS/smoothing processing unit 710 are used to determine an average global luminance value. $L_{Global}$ is the average global luminance value for the spherical image that is produced by combining the first image and the second image. $L_{Global}$ is thus computed as a geometric average. $L_{Global}$ represents the smoothed luminance values of the first image sensor and the second image sensor, which are respectively expressed as $L_{1Smoothed}$ and $L_{2Smoothed}$. $L_{Global}$ is the average global luminance can thus be expressed as:

$$L_{Global} = 2^{\frac{(\log_2 L_{1Smoothed} + \log_2 L\_2Smoothed)}{2}} = \sqrt{L_{1Smoothed} * L_{2Smoothed}}$$

The auto exposure processing unit 700 further includes a luminance merger unit 714, a delta luminance calculation unit 716, a scene target calculation unit 718, a luminance constraint calculation unit 720, a first target to exposure unit 722, a second target to exposure unit 724, a first auto exposure update unit 726, and a second auto exposure update unit 728. At least some of those units use global inputs 730, which may be or include inputs described above with respect to the global parameters and constraints 612 shown in FIG. 6. For example, the global inputs 730 may include a threshold representing a maximum exposure variance between the first image sensor and the second image sensor, a luminance variance smoothing coefficient, expotime/gain shape and constraints, and exposure value bias and constraints.

The luminance merger unit 714 combines the luminance values determined for the first and second image sensors. The combined luminance value will later be processed against a target scene luminosity. The delta luminance calculation may include determining a luminance variance between the first image sensor and the second image sensor based on the luminance values determined for the first image sensor and the second image sensor. The delta luminance calculation may also include smoothing those luminance values determined for the first and second image sensors and/or smoothing the luminance variance determined between the first and second image sensors. A luminance variance between the first image sensor and the second image sensor depends on the neutralization of the sensor luminance. As such, limiting the luminance to be neutralized directly limits the luminance variance between the first image sensor and the second image sensor. To do this, the luminance variance between the first image sensor and the second image sensor, represented as $\mathrm{Delta}_{Lum}$, is expressed in the logarithmic scale as:

$$\mathrm{Delta}_{LumEV} = \log_2 L_{1Smoothed} - \log_2 L_{2Smoothed}$$

$\mathrm{Delta}_{ExpMax}$ is a threshold value representing a maximum luminance variance between the first image sensor and the second image sensor. A clipped version of $\mathrm{Delta}_{Lum}$ may then be computed with $\mathrm{Delta}_{ExpMax}$ such that:

$$-\mathrm{Delta}_{ExpMax} < \mathrm{Delta}_{LumEV} < \mathrm{Delta}_{ExpMax}$$

The clipped luminance variance, $\mathrm{Delta}_{LumClipped}$, may be computed using minimum and maximum values based on whether the luminance variance is positive or negative. For example, $\mathrm{Delta}_{LumClipped}$ may be computed as follows:

$$\mathrm{Delta}_{LumClipped} = \begin{cases} \min(\mathrm{Delta}_{Lum}, \mathrm{Delta}_{ExpMax}) & \text{if } \mathrm{Delta}_{Lum} > 0 \\ \max(-\mathrm{Delta}_{Lum}, \mathrm{Delta}_{ExpMax}) & \text{if } \mathrm{Delta}_{Lum} < 0 \end{cases}$$

Temporal smoothing is then applied against the clipped exposure variance as follows:

$$\mathrm{Delta}_{LumCipped}(t) = (\mathrm{Delta}_{LumClipped}(t) * (1 - \alpha)) + (\mathrm{Delta}_{LumCipped}(t-1) * (\alpha))$$

The alpha value used for the temporal smoothing represents a weight used for tuning the temporal smoothing application.

The luminance constraint calculation unit 720 calculates constrained luminance values, $L_{Constrained1}$ and $L_{Constrained2}$, in the logarithmic scale using the average global luminance value and the temporally smoothed clipped exposure variance, $\mathrm{Delta}_{LumCipped}(t)$ as follows:

$$L_{Constrained1} = \log_2 L_{Global} + \frac{\mathrm{Delta}_{LumSmoothed}}{2}$$

and $$L_{Constrained2} = \log_2 L_{Global} - \frac{\mathrm{Delta}_{LumSmoothed}}{2}$$

The constrained luminance values may thus be expressed as:

$$L_{Constrained1} = 2^{\log_2 L_{Global} + \frac{\mathrm{Delta}_{LumSmoothed}}{2}} = L_{Global} * 2^{\frac{\mathrm{Delta}_{LumSmoothed}}{2}} = L_{Global} * \sqrt{2^{\mathrm{Delta}_{LumSmoothed}}}$$

and $$L_{Constrained2} = 2^{\log_2 L_{Global} - \frac{\mathrm{Delta}_{LumSmoothed}}{2}} = L_{Global} * 2^{-\frac{\mathrm{Delta}_{LumSmoothed}}{2}} = L_{Global} * \frac{1}{\sqrt{2^{\mathrm{Delta}_{LumSmoothed}}}}$$

The scene target calculation unit 718 determines a target scene luminosity. For example, $Y_{GlobalTarget}$ may represent a function of the average global luminance and represents a target luminosity for the entire scene. $Y_{GlobalTarget}$ is expressed as:

$$Y_{GlobalTarget} = f(L_{Global})$$

The scene target calculation unit 718 uses output of the luminance merger unit 714 and output of the luminance constraint calculation unit 720 to determine the target scene luminosity. The target scene luminosity is then processed using the first target to exposure unit 722 and using the second target to exposure unit 724, noting that the first target and the second target will typically be the same. The first target to exposure unit 722 and the second target to exposure unit 724 process the delta luminance values for the first and second image sensors against the target scene luminosity to determine the amount by which to adjust auto exposure configurations of the first and second image sensors to match the target scene luminosity. The determined amount by which to adjust the auto exposure configurations is then output to the first auto exposure update unit 726 and the second auto exposure update unit 728.

A first image sensor output 732 and a second image sensor output 734 are output from the auto exposure processing unit 700, and, in particular, from the first auto exposure update unit 726 and the second auto exposure update unit 728, respectively. The first image sensor output 732 and the second image sensor output 734 refer to or otherwise include information which may be used to update auto exposure configurations of the first image sensor and of the second image sensor, respectively, of the image capture device. For example, the first image sensor output 732 and the second image sensor output 734 may be expressed as a first image command and a second image command, respectively, which include information used to adjust auto exposure configurations for the respective image sensor of the image capture device.

The first auto exposure update unit 726 and the second auto exposure update unit 728, respectively, produce the first image sensor output 732 and the second image sensor output 734. For example, where the first image sensor output 732 and the second image sensor output 734 refer to or otherwise include image commands, the first auto exposure update unit 726 and the second auto exposure update unit 728 calculate the first image command, SensorCommand1, and the second image command, SensorCommand2, based on the constrained luminance values, the target luminosity for the entire scene, the exposure value bias, and the expotime/gain shape, for example, as follows:

$$\text{SensorCommand1}=f(L_{Constrained1}, Y_{GlobalTarget}, EV_{Bias}, \text{ExpotimeGain}_{Shape})$$

and $$\text{SensorCommand2}=f(L_{Constrained2}, Y_{GlobalTarget}, EV_{Bias}, \text{ExpotimeGain}_{Shape})$$

The average global luminance value for the image sensors remains unchanged as a result of updating performed using the first image sensor output 732 and the second image sensor output 734. As such, an average global luminance value determined based on updated auto exposure configurations of the image sensors of the image capture device implementing the auto exposure processing unit 700 equal the average global luminance value determined prior to some or all of the processing using the auto exposure processing unit 700.

In some implementations, $L_{Global}$ may be computed as an arithmetic average. For example, $L_{Global}$ may be expressed as the arithmetic average of the two luminance values, $L_{1Smoothed}$ and $L_{2Smoothed}$. In such an implementation, the value of $L_{Global}$ may become more invariant to the rotation of the image capture device in at least some structures where $\text{Delta}_{ExpMax}$ equals zero. Tis value of $L_{Global}$ may also avoid collapsing global luminance when one of the two hemispheres is very dark (e.g., with a protection aspect) and therefore may reduce an overexposure of the other hemisphere.

Further details of implementations and examples of techniques auto exposure processing for spherical images are now described. FIGS. 8-9 are flowcharts showing examples of techniques 800 and 900 for auto exposure processing for spherical images. The technique 800 and/or the technique 900 can be performed, for example, using hardware and/or software components of an image capture system, such as the image capture device 100 shown in FIGS. 1A-D or the image capture device 200 shown in FIGS. 2A-C. The image capture device 100 or the image capture device 200 may be implemented using an auto exposure processing unit of an image capture and processing pipeline, for example, as described in the auto exposure processing unit 418 shown in FIG. 4 or the auto exposure processing unit 518 shown in FIG. 5.

In another example, the technique 800 and/or the technique 900 can be performed using an integrated circuit. The integrated circuit may, for example, be a field programmable gate array (FPGA), programmable logic device (PLD), reconfigurable computer fabric (RCF), system on a chip (SoC), ASIC, and/or another type of integrated circuit. An image processor of the integrated circuit may, for example, include a processor having one or multiple cores configured to execute instructions to perform some or all of the technique 800 and/or the technique 900.

Although the technique 800 and the technique 900 are each described with respect to a series of operations, the operations comprising the technique 800 and/or the technique 900 may be performed in orders other than those described herein. In some implementations, the technique 800 and/or the technique 900 may include additional, fewer, or different operations than those described herein.

Referring first to FIG. 8, an example of the technique 800 for auto exposure processing for spherical images is shown. At 802, luminance values are determined for each of the first image sensor and the second image sensor. The luminance values represent luminance within each individual hemisphere of the spherical image to be produced. The luminance values may be determined based on auto exposure configurations (e.g., identified based on auto exposure control statistics) obtained for each of the first image sensor and the second image sensor.

At 804, an average global luminance value is determined based on the luminance values determined for the first image sensor and the second image sensor, and thus indirectly based on auto exposure configurations of first and second image sensors of an image capture device. The average global luminance value is determined as an average of smoothed luminance values of the first image sensor and of the second image sensor. In some implementations, the average global luminance value is computed as a geometric average. In some implementations, the average global luminance value is computed as an arithmetic average.

At 806, delta luminance values are determined for the first and second image sensors. The delta luminance values are determined based on the average global luminance value and based on the luminance values determined for each of the first and second image sensors. For example, determining the luminance values may include determining a luminance variance between the first and second image sensors based on the luminance values determined for each of the first and second image sensors. The luminance variance represents a difference in exposure of the first and second image sensors based on the luminance recorded thereby. The luminance variance can be determined as a difference between smoothed luminance values for each of the image sensors. Clipped luminance variance values for the delta luminance values may then be determined based on a comparison between the luminance variance and a threshold value representative of a maximum luminance variance between the first image sensor and the second image sensor. Smoothed delta luminance values may then be produced by applying temporal smoothing against the clipped luminance variance values.

At 808, the auto exposure configurations of the first image sensor and/or of the second image sensor are updated. Updating the auto exposure configurations of the first image sensor and/or of the second image sensor may include determining constrained luminance values for the first image sensor and the second image sensor based on the average global luminance value and the smoothed delta luminance values. The update to the first auto exposure configurations and the second auto exposure configurations may then be limited based on the constrained luminance values.

For example, limiting the update to the first auto exposure configurations and the second auto exposure configurations based on the constrained luminance values may include determining whether the update to the first auto exposure configurations and the second auto exposure configurations using the smoothed delta luminance values causes a combined luminance value for the first image sensor and the second image sensor to exceed a target scene luminosity value of the constrained luminance values.

Where the update does cause the combined luminance value to exceed the target scene luminosity, the first auto exposure configurations and the second auto exposure configurations may be updated using the smoothed delta luminance values. However, where the update does not cause the combined luminance value to exceed the target scene luminosity, the smoothed delta luminance values may be discarded, in which case the auto exposure configurations of the first image sensor and the second image sensor are not updated or otherwise adjusted.

At 810, a first image is captured by the first image sensor according to the updated auto exposure configurations of the first image sensor. At 812, a second image is captured by the second image sensor according to the updated auto exposure configurations of the second image sensor. At 814, a spherical image is produced by combining the first and second images. As a result of the updating of the auto exposure configurations of the first and second image sensors, luminance variances local to the stitch line of the spherical image and which would otherwise have been visible are reduced or eliminated.

In some implementations, each operation described above with respect to the technique 800 may be performed for each image to be captured using the image sensors of the image capture device. In some implementations, some of the operations described above with respect to the technique 800 may be performed in discrete image intervals, such as once every N (e.g., 10) images. For example, an average global luminance value may be determined once every N images, while a luminance variance, delta luminance values, and luminance updating may be performed for each image.

Referring next to FIG. 9, an example of the technique 900 for auto exposure processing for spherical images is shown. At 902, first and second images are captured using first and second image sensors of an image capture device. At 904, auto exposure control statistics are obtained for the first and second images. The auto exposure control statistics may represent information about auto exposure configurations of the first and second image sensors used to capture the first and second images.

At 906, luminance values are determined for each of the first and second images. The luminance values represent luminance within each individual hemisphere of the spherical image. The luminance values may be determined based on auto exposure control statistics obtained for each of the first image sensor and the second image sensor.

At 908, an average global luminance value is determined for a spherical image. The spherical image is a spherical image to be produced later using the first and second images, such as after further processing of exposure values of the first and/or second images. The average global luminance value can be determined by calculating a total luminance for the spherical image, such as without regard to the stitch line, based on the luminance values determined for the first and second images. In some implementations, the average global luminance may be based on a target scene luminosity for the spherical image.

At 910, delta luminance values are determined for each of the first and second images. The delta luminance values represent luminance amounts by which to update the luminance values of the first and second images, such as based on the average global luminance value and the luminance values for each of the first and second images. For example, the delta luminance values can be determined by adjusting the combined value of the luminance values until that combined value reaches the average global luminance value. The adjusting can include changing the luminance value for one or both of the first image or the second image.

At 912, the first and second images are updated using delta luminance values. Updating the first and second images using the delta luminance values can include post-processing the first and/or second images to change a total amount of luminance of the first and/or second images according to the delta luminance values. At 914, a spherical image is produced based on the updated first and second images. In some implementations in which the spherical image is already produced, such as to determine the average global luminance value, producing the spherical image can include updating the spherical image based on the updates made to the first and/or second images.

In some implementations, each operation described above with respect to the technique 900 may be performed for each image to be captured using the image sensors of the image capture device. In some implementations, some of the operations described above with respect to the technique 900 may be performed in discrete image intervals, such as once every N (e.g., 10) images. For example, an average global luminance value may be determined once every N images, while luminance information, delta luminance values, and luminance updating may be performed for each image.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or another device capable of executing a set of instructions.

As used herein, the term "computer program" or "software" is meant to include any sequence of machine-cognizable steps which perform a function. Such program may be rendered in any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include FPGAs, PLDs, RCFs, SoCs, ASICs, and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), DRAM, Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of DSPs, reduced instruction set computers (RISCs), general-purpose complex instruction set computing (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, Cellular Digital Packet Data (CDPD), satellite systems, millimeter wave or microwave systems, acoustic, infrared (i.e., IrDA), and/or other wireless interfaces.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. An image capture device, comprising:

a first image sensor;

a second image sensor;

a processor; and a memory including instructions executable by the processor to:

obtain, for the first image sensor, first inputs including first local luminance shading (LLS) radial profile information and first LLS and local exposure compensation (LEC) map information;

obtain, for the second image sensor, second inputs including second LLS radial profile information and second LLS and LEC map information;

determine, based on the first inputs and the second inputs, an average global luminance value for a spherical image;

update first auto exposure configurations of the first image sensor and second auto exposure configurations of the second image sensor according to the average global luminance value; and produce the spherical image using the updated first auto exposure configurations and the updated second auto exposure configurations.

2. The image capture device of claim 1, wherein the first inputs are first local constraints associated with the first image sensor, the second inputs are second local constraints associated with the second image sensor, and the first local constraints and the second local constraints each include one or more of radial weight information, expotime/gain information, or a smoothing coefficient.

3. The image capture device of claim 2, wherein the instructions are further executable by the processor to:

perform LLS radial correction using the first LLS radial profile information and the second LLS radial profile information;

perform LLS and LEC map correction using the first LLS and LEC map information and the second LLS and LEC map information;

perform a weighted average computation using the radial weight information of the first local constraints and of the second local constraints;

perform a luminance computation using the expotime/gain information of the first local constraints and of the second local constraints; and perform temporal smoothing using the smoothing coefficient of the first local constraints and of the second local constraints.

4. The image capture device of claim 3, wherein the first inputs are processed based on RGB statistics and a region of interest (ROI) associated with the first image sensor and the second inputs are processed based on RGB statistics and an ROI associated with the second image sensor to determine the average global luminance value.

5. The image capture device of claim 4, wherein the instructions are further executable by the processor to:

perform RGB statistics maximization using the RGB statistics associated with the first image sensor and the RGB statistics associated with the second image sensor; and perform weight map processing of the ROI associated with the first image sensor and the ROI associated with the second image sensor against a weight map.

6. The image capture device of claim 1, wherein the average global luminance value is a geometric or arithmetic average representing smoothed luminance values of the first image sensor and of the second image sensor.

7. The image capture device of claim 1, wherein the average global luminance value is determined using a first luminance value determined for the first image sensor based on the first inputs and a second luminance value determined for the second image sensor based on the second inputs.

8. The image capture device of claim 7, wherein a first image obtained using the first image sensor according to the updated first auto exposure configurations and a second image obtained using the second image sensor according to the updated second auto exposure configurations are combined to produce the spherical image.

9. The image capture device of claim 1, wherein the average global luminance value is determined using a first luminance value determined for a first image obtained using the first image sensor and a second luminance value determined for a second image obtained using the second image sensor.

10. The image capture device of claim 9, wherein the first image is updated according to the updated first auto exposure configurations and the second image is updated according to the updated second auto exposure configurations to produce the spherical image.

11. An image processor, comprising:

one or more processing block units configured to:

obtain first inputs associated with a first image sensor and second inputs associated with a second image sensor, wherein the first inputs include first local luminance shading (LLS) radial profile information and first LLS and local exposure compensation (LEC) map information and the second inputs include second LLS radial profile information and second LLS and LEC map information;

determine an average global luminance value based on the first inputs and the second inputs;

update first auto exposure configurations of the first image sensor and second auto exposure configurations of the second image sensor according to the average global luminance value; and produce a spherical image using the updated first auto exposure configurations and the updated second auto exposure configurations.

12. The image processor of claim 11, wherein the one or more processing block units include a first processing unit configured to process the first inputs and RGB statistics and a region of interest (ROI) associated with the first image sensor and a second processing unit configured to process the second inputs and RGB statistics and an ROI associated with the second image sensor, wherein the first inputs and the second inputs each include one or more of radial weight information, expotime/gain information, or a smoothing coefficient, and wherein each of the first processing unit and the second processing unit includes one or more processing subunits configured to:

perform RGB statistics maximization using the RGB statistics associated with the first image sensor and the RGB statistics associated with the second image sensor;

perform weight map processing of the ROI associated with the first image sensor and the ROI associated with the second image sensor against a weight map;

perform LLS radial correction using the first LLS radial profile information and the second LLS radial profile information;

perform LLS and LEC map correction using the first LLS and LEC map information and the second LLS and LEC map information;

perform a weighted average computation using the radial weight information of the first inputs and the radial weight information of the second inputs;

perform a luminance computation using the expotime/gain information of the first inputs and the expotime/gain information of the second inputs; and perform temporal smoothing using the smoothing coefficient of the first inputs and the smoothing coefficient of the second inputs.

13. The image processor of claim 11, wherein a first image obtained using the first image sensor according to the updated first auto exposure configurations and a second image obtained using the second image sensor according to the updated second auto exposure configurations are combined to produce the spherical image.

14. The image processor of claim 11, wherein a first image obtained using the first image sensor is updated according to the updated first auto exposure configurations and a second image obtained using the second image sensor is updated according to the updated second auto exposure configurations to produce the spherical image.

15. A method, comprising:

determining, for a spherical image to produce, an average global luminance value based on first inputs obtained for a first image sensor and second inputs obtained for a second image sensor, wherein the first inputs include first local luminance shading (LLS) radial profile information and first LLS and local exposure compensation (LEC) map information and the second inputs include second LLS radial profile information and second LLS and LEC map information;

determining, using the average global luminance value, updated first auto exposure configurations of the first image sensor and updated second auto exposure configurations of the second image sensor; and producing the spherical image using the updated first auto exposure configurations and the updated second auto exposure configurations, wherein producing the spherical image using the updated first auto exposure configurations and the updated second auto exposure configurations reduces or eliminates local exposure variation along a stitch line of the spherical image.

16. The method of claim 15, wherein the first inputs are first local constraints associated with the first image sensor, the second inputs are second local constraints associated with the second image sensor, and the first local constraints and the second local constraints each include one or more of radial weight information, expotime/gain information, or a smoothing coefficient.

17. The method of claim 16, wherein determining the average global luminance value comprises:

processing the first local constraints based on RGB statistics and a region of interest (ROI) associated with the first image sensor and the second local constraints based on RGB statistics and an ROI associated with the second image sensor.

18. The method of claim 17, wherein the average global luminance value is a geometric or arithmetic average representing smoothed luminance values of the first image sensor and of the second image sensor.

19. The method of claim 15, wherein producing the spherical image comprises:

obtaining a first image using the first image sensor according to the updated first auto exposure configurations;

obtaining a second image using the second image sensor according to the updated second auto exposure configurations; and combining the first image and the second image to produce the spherical image.

20. The method of claim 15, wherein producing the spherical image comprises:

updating, according to the updated first auto exposure configurations, a first image obtained using the first image sensor;

updating, according to the updated second auto exposure configurations, a second image obtained using the second image sensor; and combining the first image and the second image to produce the spherical image.

* * * * *